United States Patent [19]
Pinson

[11] Patent Number: 4,837,451
[45] Date of Patent: Jun. 6, 1989

[54] RING ARRAY IMAGING SYSTEM
[75] Inventor: George T. Pinson, Huntsville, Ala.
[73] Assignee: The Boeing Company, Seattle, Wash.
[21] Appl. No.: 89,531
[22] Filed: Aug. 26, 1987
[51] Int. Cl.[4] .................. H01L 25/02; H01L 31/00
[52] U.S. Cl. ................................ 250/578; 250/332; 250/353; 358/212
[58] Field of Search ............ 250/578, 332, 353, 363 S; 358/294, 212, 213.11, 213.13; 378/4

[56] References Cited
U.S. PATENT DOCUMENTS

| | | |
|---|---|---|
| 1,988,946 | 1/1935 | Hauser et al. |
| 2,457,253 | 12/1948 | Martin . |
| 3,073,957 | 1/1963 | Jones . |
| 3,448,268 | 6/1969 | Proctor . |
| 3,742,234 | 6/1973 | Laakmann . |
| 3,924,937 | 12/1975 | Munroe et al. . |
| 4,030,816 | 6/1977 | Belke et al. . |
| 4,031,384 | 6/1977 | Sherman, Jr. . |
| 4,103,160 | 7/1978 | Moss .................. 250/332 |
| 4,178,522 | 12/1979 | MacLennan et al. ........... 250/332 |
| 4,228,357 | 10/1980 | Annis .................. 250/363 S |
| 4,271,360 | 6/1981 | Ward .................. 250/353 |
| 4,431,917 | 2/1984 | Gibbons .................. 250/332 |
| 4,518,232 | 5/1985 | Dagenais . |
| 4,585,315 | 4/1986 | Sincerbox et al. . |
| 4,652,926 | 3/1987 | Withers et al. .............. 358/213.13 |

Primary Examiner—Edward P. Westin
Attorney, Agent, or Firm—Finnegan, Henderson, Farabow, Garrett & Dunner

[57] ABSTRACT

A ring array camera includes a telescope for focusing an image onto an imaginary focal plane, an annular array of image detecting elements disposed on a substantially flat disc, a primary reflector cone positioned proximate the imaginary focal plane and having a substantially conical primary reflecting surface reflecting the focused image radially outwardly, and a secondary reflector positioned radially outwardly of the primary reflector and having a substantially conical secondary reflecting surface reflecting the focused image from the primary reflector cone onto the annular array of image detecting elements. In a second embodiment of the invention, a linear actuator is connected to the primary reflector cone for reciprocating the primary reflector cone to scan the focused image radially inwardly and outwardly across the annular array of image detecting elements.

30 Claims, 5 Drawing Sheets

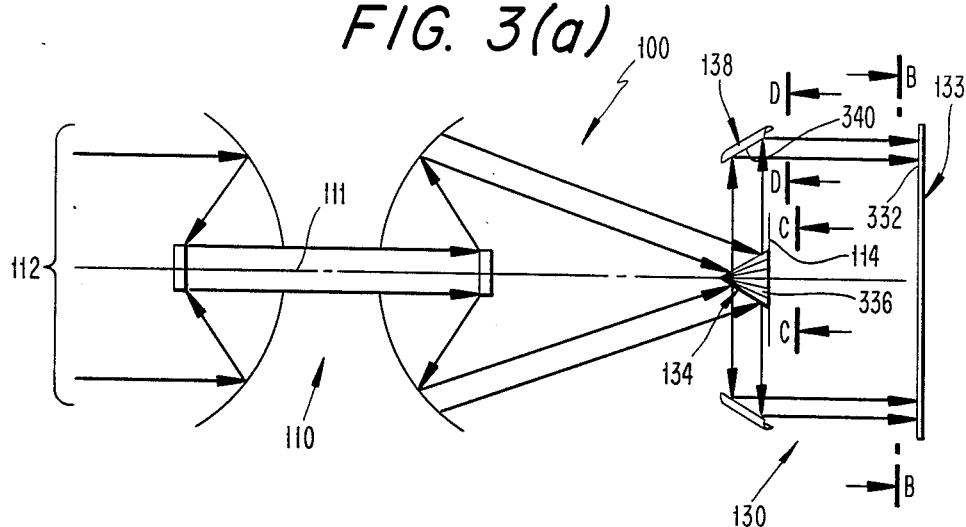
FIG. 3(a)
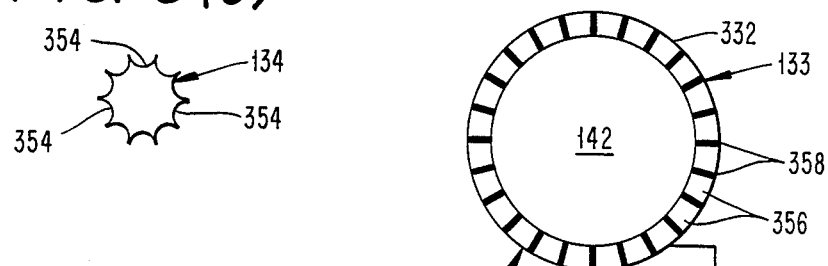
FIG. 3(c)
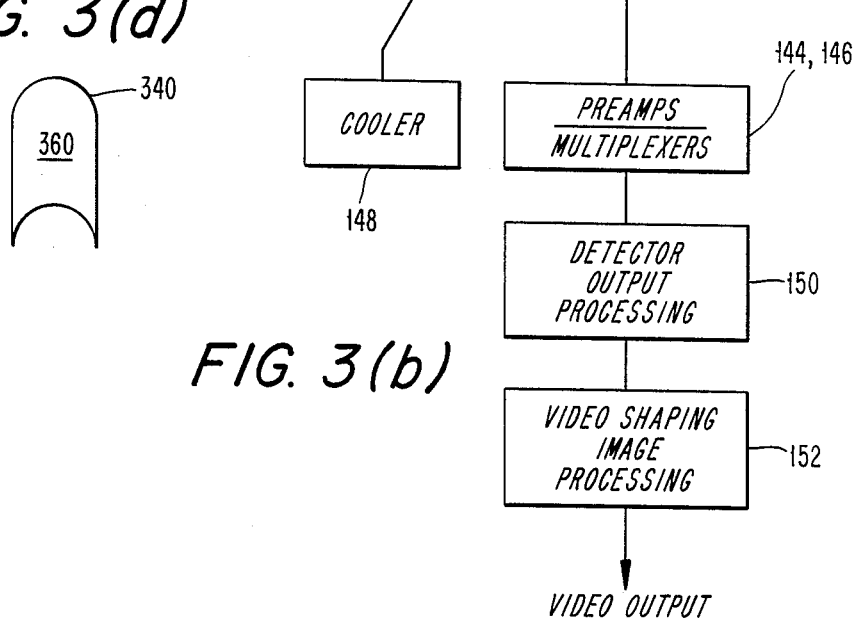
FIG. 3(d)
FIG. 3(b)

RING ARRAY IMAGING SYSTEM

BACKGROUN OF THE INVENTION

1. Field of the Invention

This invention relates to an optical imaging system. More particularly, the invention relates to an infrared imaging system in which the image is projected onto an annular array of image detecting elements.

2. Description of the Related Art

In conventional infrared optical imaging systems, a telescope or other optical system focuses an image onto a rectangular array of image detecting elements positioned at the focal plane of the telescope. the focal plane array typically is comprised of a matrix of elements having, for example, 512 rows and 512 columns of detector elements. As is well known in the art, the larger the number of elements, the better the resolution.

The detector matrix in conventional infrared imaging systems typically measures on the order of 1–2 cm on each side. Recently, 512×512 focal plane arrays having outer dimensions of 8.6 mm×8.8 mm have been developed. A major disadvantage of the conventional rectangular-matrix array system, however, is in part attributable to the advances in miniaturizing such arrays. It is difficult to provide the array with the proper placement of necessary wiring leads connecting the array to support multiplexing and data procesing devices.

The present invention is intended to provide an imaging system that spreads out the focused image and the detector elememt array to facilitate making the electical connections to the image detecting elements.

The present invention also is intended to provided an improved imaging system in which the focused image is scanned across an array of image detecting elements.

Additional advantages of the present invention will be set forth in part in the description that follows and in part will be obvious from that description or can be learned by practice of the invention. The advantages of the invention can be realized and obtained by the apparatus particularly pointed out in the appended claims.

SUMMARY OF THE INVENTION

The present invention overcomes the problems of the prior art imaging systems by providing an imaging system tht spreads out the focuses image onto an annular array of detector elements having a radially inward image-free area by using the concept of plane image separation.

To overcome the problems of the prior art imaging systems and in accordance with the purpose of the invention, as embodied and broadly described herein, the ring array imaging system of this invention comprises an annular array of image detecting elements substantially axisymmetric about a longitudinal axis and means for projecting onto the annular array an image focused onto an imaginary focal plane positioned proximate the longitudinal axis.

Preferably, the imaging system of this invention is embodied in a ring array camara comprising means for focusing an image onto an imginary focal plane, an annular array of image detecting elements disposed on a substantially flat disc, a primary reflector cone, and a secondary reflector. The annular array is substantially axisymmetric about a longitudinal axis passing through the imaginary focal plane, and the annular array and the focusing means are on longitidinal opposite sides of the imaginary focal plane. The primary reflector cone is positioned at the longitudinal axis proximate the imaginary focal plane and has a substantially conical primary reflecting surface reflecting the focused image radially outwardly with respect to the longitudinal axis. The secondary reflector is positioned radially outwardly of the primary reflector cone with respect to the longitudinal axis and has a substantially conical secondary reflecting surface reflecting the focused image from the primary reflector cone onto the annular array of image detecting elements.

In a second preferred embodiment of this invention, the ring array imaging system is provided with means for scanning the focused image radially inwardly and outwardly across the annular array of detecting elements. Preferably, the scanning means includes a linear actuator that reciprocates the primary reflector cone forward and backward along the longitudinal axis.

The accompanying drawings, which are incorporated in and which constitute a part of this specification, illustrate at least one embodiment of the invention and, together with the description, explain the principles of the invention.

BRIEF DESCRIPTION OF THE DRAWINGS

FIG. 3(a) is a schematic longitudinal view of the first embodiment of the present invention in which the primary reflector cone and the secondary reflector both include a plurality of circumferentially disposed concave facets;

FIG. 3(b) is a view taken along line B—B of FIG. 3(a) showing the annular detector array and associated electronics;

FIG. 3(c) is a view taken along line C—C of FIG. 3(c) showing the faceted shaped of the primary reflector cone;

FIG. 3(d) is a view taken along line D—D of FIG. 3(a) showing the concave shape of the stationary reflector;

DETAILED DESCRIPTION OF THE PREFERRED EMBODIMENTS

Figure 1A:
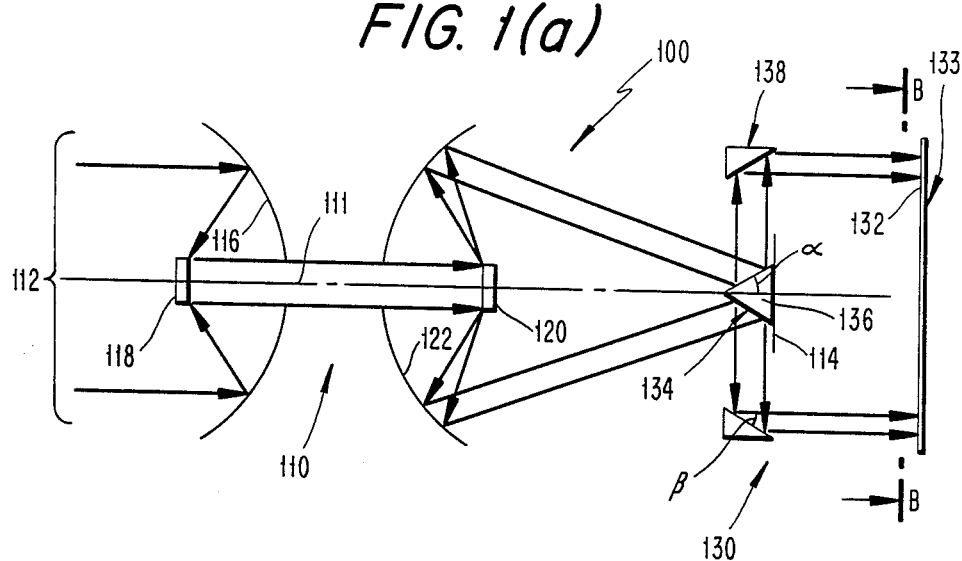
FIG. 1(a) is a schematic longitudinal view of the first embodiment of the present invention in which the primary reflector cone is smooth right circular cone.

Reference now will be made in detail to the presently preferred embodiments of the invention, examples of which are illustrated in the accompanying drawings.

The present invention will be described with reference to an infrared camara employing the novel imaging system of this invention. As will be apparent to one of ordinary skilll in the art, however, the present invention is applicable to camaras and other imaging systems that are responsive to light of other wavelengths.

The first embodiment of the invention will be described with reference to ring array camara 100, which is shown schematically in FIG. 1(a).

In accordance with the invention, ring array camara 100 includes means for focusing an image onto an imaginary focal plane. As embodied herein, the focusing means includes telescope 110, which has a longitudinal axis 111 and is configured to focus the image transmitted by incoming infrared radiation 112 onto a nominal focal plane 114. Nominal focal plane 114 is positioned at longitudinal axis 111 and preferable is orthogonal to axis 111. In the embodiment shown in FIG. 1(a), telescope 110 is a catoptric zoom telescope of the type described in copending U.S. patent application Ser. No. 929,356, now U.S. Pat. No. 4,812,030, issued Mar. 14, 1989 which is incorporated herein by reference. Of course, other telescopes, both reflecting and refracting, can be used instead of catoptric zoom telescope 110 to focus the image onto focal place 114.

Telescope 110 employs four reflectors to focus the infrared image onto nominal focal plane 114. The image is reflected by first reflector 116 toward second reflector 118, which in turn reflects the image onto third reflector 120. Third reflector 120 reflects the image onto fourth reflector 122, which is configured to focus the image onto focal plane 114. Magnification of the focused image can be adjusted by moving reflectors 118 and 122 relative to each other and to reflectors 116 and 120 along longitudinal axis 111.

With further reference to FIG. 1(a), camera 100 also includes ring array imaging system 130. In accordance with the invention, ring array imaging system 130 includes an annular array 132 of image detecting elements and means for projecting onto the annular array of image detecting elements an image focused onto focal plane 114. In the embodiment shown in FIG. 1(a), annular array 132 is mounted on a substantially flat disc 133 disposed orthogonal to axis 111 and positioned longitudinally opposite telescope 110 with respect to focal plane 114.

As embodied herein and shown in FIG. 1(a), the projecting means of the present invention includes primary reflector cone 134, which is positioned at longitudinal axis 111 with its base portion proximate nominal focal plane 114. Primary reflector cone 134 has a subtantially conical primary reflecting surface 136, which reflects the image focused by telescope 110 radially outwardly with respect to longitudinal axis 111. Primary reflecting surface 136 preferably is axisymmetric with respect to longitudinal axis 111.

Figure 2A:
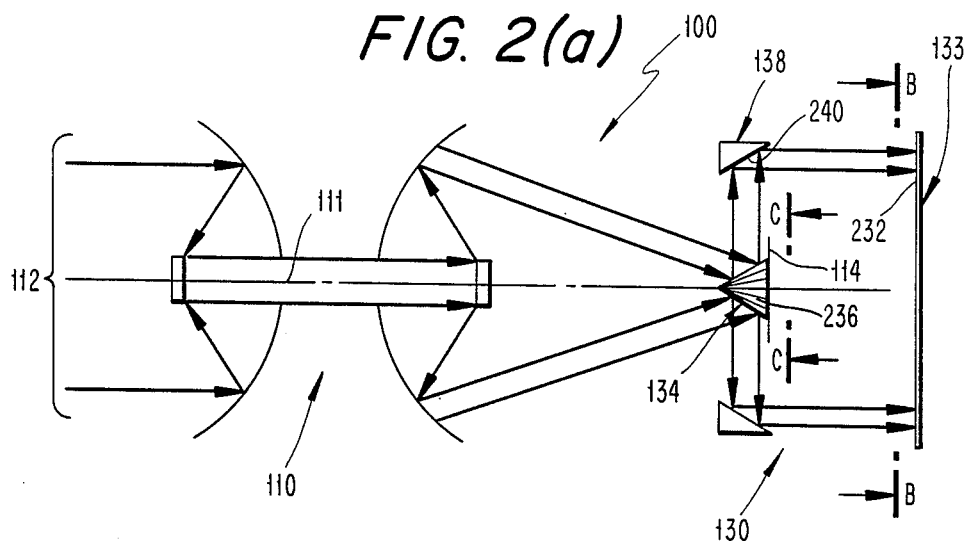
FIG. 2(a) is a schematic longitudinal view of the first embodiment of the present invention in which the primary reflector cone includes a plurality of circumferentially disposed planar facets.

As embodied in FIG. 2(a), the projecting means of this invention further includes secondary reflector 138, which is positioned radially outwardly of primary reflector cone 134. Secondary reflector 138 has a substantially conical secondary reflecting surface 140, which reflects the focused image from primary reflector cone 134 onto annular array 132 of image detecting elements. Secondary reflecting surface 140 preferably is axisymmetric with respect to longitudinal axis 111. Disc 133 containing array 132 can be positioned at any convenient distance from secondary reflector 138, which provides much greater flexibility in providing the necessary connections to the detector element array when compared to conventional imaging devices, which require the detector elements to be placed at the focal plane of the focusing device.

Figure 1B:
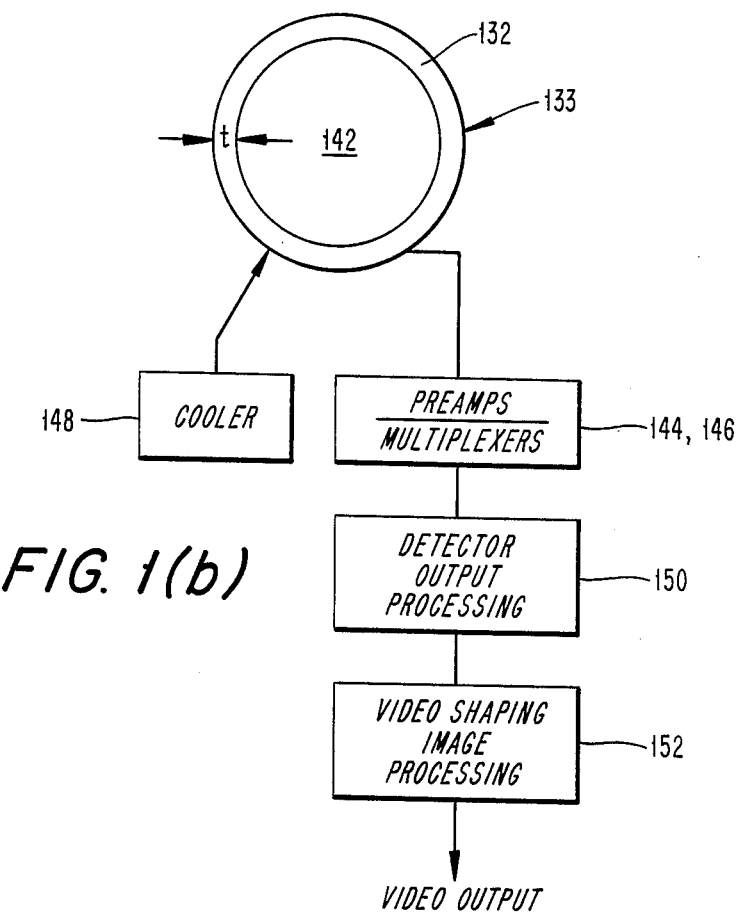
FIG. 1(b) is a view taken along line B—B of FIG. 1(a) showing the annular detector array and associated electronics.

Furthermore, as shown in FIG. 1(b), which is a schematic face-on view of disc 133 and the electronic devices connected to array 132, disc 133 includes image-free area 142 positioned radially inwardly from the detector elements of array 132. In the presently preferred embodiment, image-free area 142 is approximately 2.5 cm in diameter, which provides suffucient space for mounting preamps 144, multiplexers 146, and other support electronics. As shown in FIG. 1(b), array 132 also is provided with a cooler 148 for maintaining the detector elements at a preselected temperature, generally at about 77° K. The cooler can be thermoelectric, cryostatic, or another gas-cooled cooler for maintaining the detectors at the desired temperature for detecting images in the infrared frequency band.

Multiplexers 146 sample each of the individual detector elements of array 132, the individual outputs of which are conditioned and amplified by preamps 144. If necessitated by the detector design selected to comprise array 132, individual calibration factors can be applied to the individual readings of the detectors by individual detector output processing 150. Detector output processing 150 also can be used to provide other specialized data processing for converting detector output into the desired format, such as into digital signals. Video shaping and image processing 152 operates on the sampled signal to provide a standard video output.

In the embodiment shown in FIG. 1(a), detector array 132 preferable includes 262,144 detector elements, which of course is the same number of detector elements in a conventional 512×512 rectangular array. The presently preferred embodiment therefore provides the same resolution as state-of-the-art infrared cameras having a rectangular arrays. In annular array 132, the detector elements preferably are arranged in 256 concentric rings. With image-free area 142 being approximately 2.5 cm in diameter, the radial thickness t of array 132 preferable is about 0.5 cm. Of course, array 132 can be comprised of a larger or smaller number of image detecting elements.

Athough FIG. 1(a) shows array 132 being mounted on flat disc 133, the image detecting elements of array 132 alternatively can be mounted on teh conical surface corresponding to second reflecting surface 140.

In the embodiment shown in FIG. 1(a), the primary reflecting surface 134 and secondary reflecting surface 140 respectively form angles $\alpha$ and $\beta$ with longitudinal axis 111. Preferably both $\alpha$ and $\beta$ are 45° so that the focused image reflected by primary reflecting surface 136 is orthogonal to longitudinal axis 111 and the image reflected by secondary reflecting surface 140 is parallel to axis 111. The resulting annular image has substantially the same inner and outer radius as secondary refleting surface 140. Angles $\alpha$ and $\beta$ . however, can be set at other values in order to converge the image on to a smaller annular array 132 or diverge the image onto a larger array.

Figure 2B:
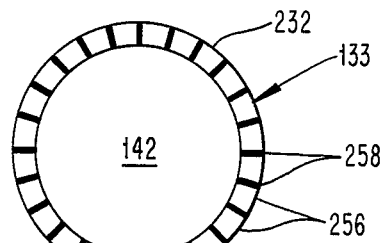
FIG. 2(b) is a view taken along line B—B of FIG. 2(a) showing the annular detector array and associated electronics.

Further refinement of the imaging system of this invention can be achieved by proper shaping of the substantially conical reflecting surfaces of primary reflector cone 134 and secondary reflector 138. A first example of the optical system of this invention with specially shaped reflecting surfaces in shown in FIGS. 2(a) through 2(b), in which elements previously described with reference of FIGS. 1(a) and 1(b) have like reference numbers and will not be described again in detail.

Figure 2C:
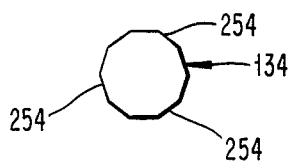
FIG. 2(c) is a view taken along line C—C of FIG. 2(a) showing the faceted shape of the primary reflector cone.

As shown in FIGS. 2(a) and 2(c), primary reflector cone 134 can be provided with primary reflecting surface 236 comprised of a plurality of circumferentially disposed primary facets 254 which, as shown in FIG. 2(c), are substantially planar.

The angle between the facets is a function of the separation desired. For example, a 512-facet primary reflecting surface 236 would be provided with facets having an angle approximately 0.703° (360°/512) between them. With such circumferential image separation, the image detector array 232 can be comprised of 512 separate detector arrays 256 (each consisting of a plurality of radially disposed image detecting elements) having image free areas 258 therebetween, as show in FIG. 2(b). Circumferentially disposed image-free areas 258 can be used, along with radially inward image-free area 142, for interconnect wiring or chip processing. Preferably, secondary reflector 138 includes secondary reflecting surface 240 having circumferentially disposed facets corresponding to and radially aligned with facets 254 of primary reflecting surface 236. Alternatively, detector arrays 258 can be mounted on surface 240.

Figure 4A:
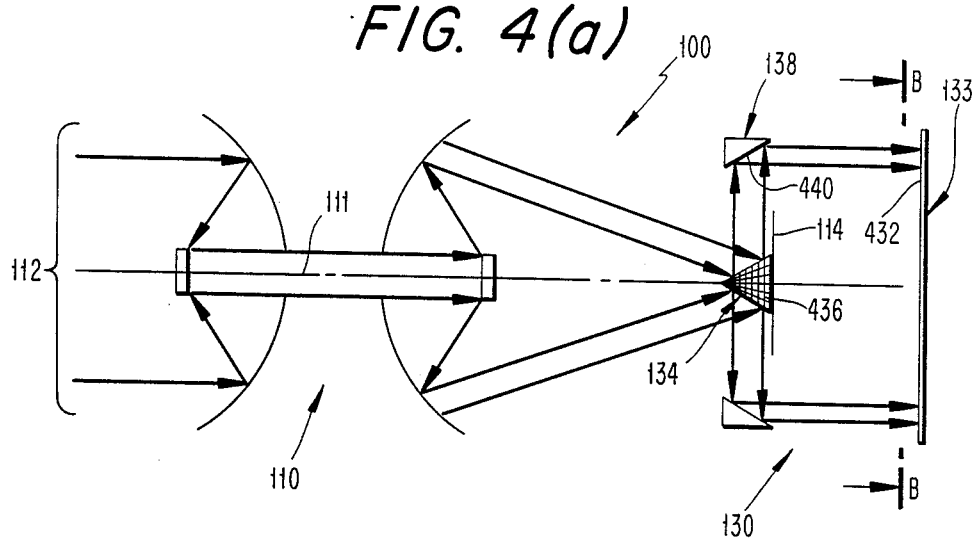
FIG. 4(a) is a longitidinal view of the first embodiment of the present invention in which the primary reflector cone has longitudinally and circumferentially disposed facets.
Figure 4B:
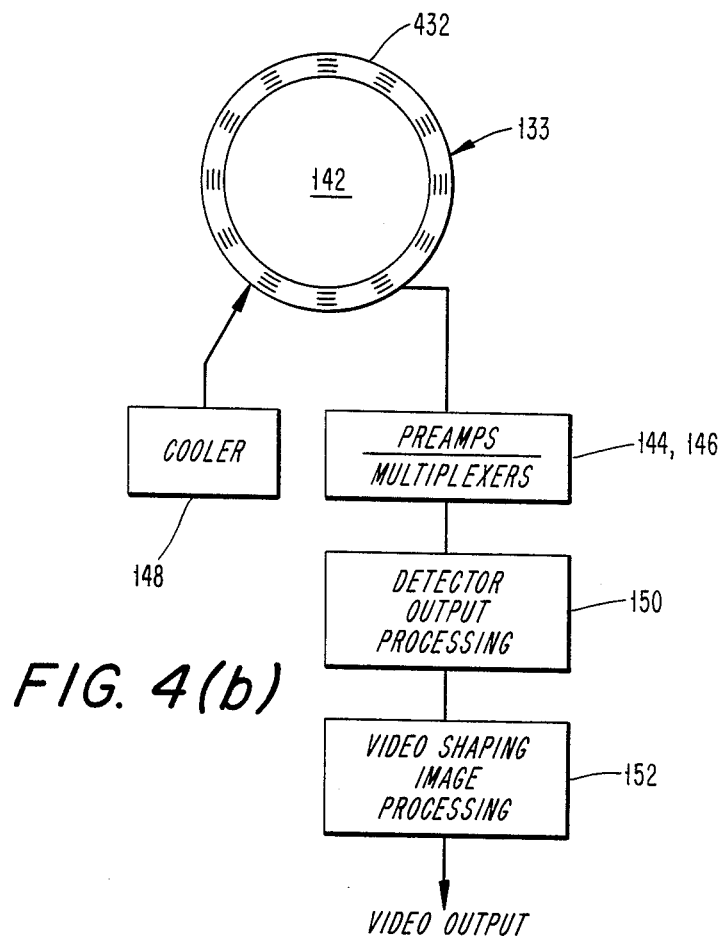
FIG. 4(b) is a view taken along line B—B of FIG. 2(a) showing the annular detector array and associated electronics.

Further refinements in the first embodiment of this invention are shown in FIGS. 3(a) through 3(d) and in FIGS. 4(a) and 4(b). The example shown in FIGS. 3(a) through 3(d) is substantially identical to that of FIGS. 2(a) through 2(c) except that facets 354 of primary reflecting surface 336 and facets 360 of secondary reflecting surface 340 are concave in shape. As seen in FIG. 3(b), image detector array 332 can be comprised of separate detector arrays 356 with image-free areas 358 therebetween. In FIGS. 4(a) and 4(b), primary reflector cone 134 and secondary reflector 138 are provided on reflector surfaces 436, 440 with a plurality of circumferentially and longitudinally disposed facets, which project onto array 432 and image divided into a matrix of radially and circumferentially disposed image segments. The facets on primary reflecting surface 436 can be aligned with the facets on primary reflecting surface 440, or deliberate misalignment can be provided to further separate the image projected on to detector array 432.

Figure 5A:
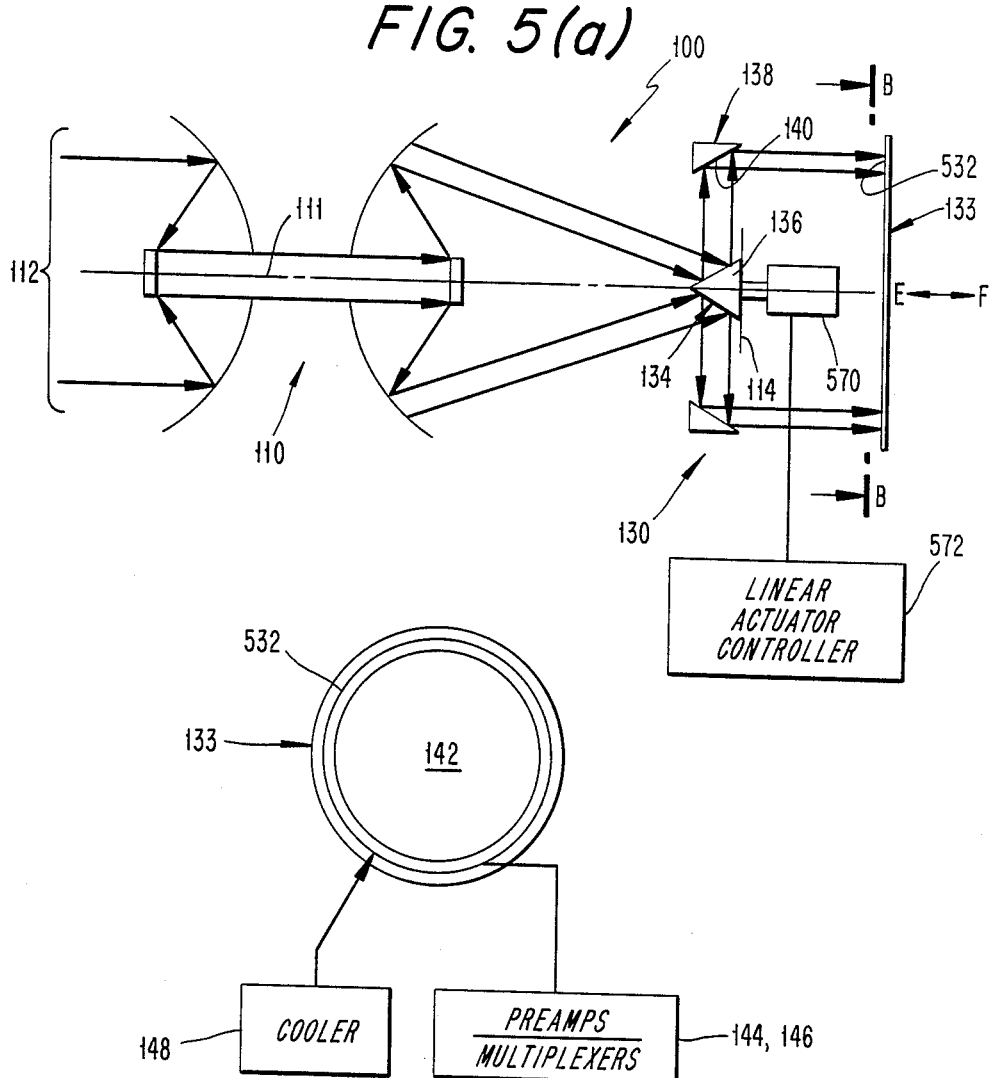
FIG. 5(a) is a longitudinal view of the second embodiment of the present invention, in which the primary reflector cone is reciprocated in the longitudinal direction to provide scanning of the annular image across the annular array of detecting elements.
Figure 5B:
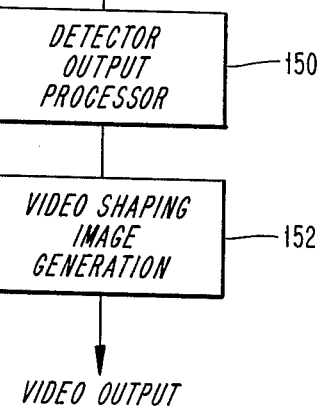
FIG. 5(b) is a view taken along line B—B of FIG. 5(a) showing the annular detector array and associated electronics.

FIGS. 5(a) and 5(b) show a second major embodiment of the present invention. Elements previously described with respect to FIGS. 1(a) and 1(b) are designated by like referenced numerals and will not be described again in detail.

The embodiment shown in FIG. 5(a) differs from that of FIG. 1(a) by including means for scanning the image focused on focal plane 114 radially inwardly and outwardly across the annular array of detecting elements. As embodied in FIG. 5(a), the scanning means includes linear actuator 570, which under the control of linear actuator controller 572 reciprocates primary reflector cone 134 in the directions of arrows E and F along longitudinal axis 111. As will be apparent to one of ordinary skill in the art, reciprocation of primary reflector cone 136 in the direction of arrows E and F will move the image projected onto the annular array of detector elements radially inwardly and outwardly across the detector elements. Preferably, the rate of reciprocation of primary reflector cone 134 coincides with the standard television scan rate. Because the image is being radially scanned, the multi-ring array of detector elements used in the embodiment of FIGS. 1(a) and 1(b) can be replaced by a single linear array 532 of detector elements arranged in a circle, as shown in FIG. 5(b).

As will be obvious to one of ordinary skill in the art, the primary reflector cone 134 and secondary reflector 138 can be provided on their reflecting surfaces with faceted reflectors in the same manner as described with respect to the first major embodiment of this invention. In addition, the image detecting elements can be provided on the secondary reflecting surface instead of on flat disc 133. Furthermore, linear actuator 570 can be replaced with a cam or crank mechanism driven by a motor, a piezoelectric vibrator, or other means for reciprocating primary reflector cone 134.

Although the embodiment of the scanning ring array camera shown in FIGS. 5(a) and 5(b) is directed primarily to infrared imaging, the scanning camera can readily be modified to provide multi-wavelength imaging by using an array of detector elements disposed in concentric rings, wherein the elements of each ring are sensitive to a particular range of optical wavelengths. In the example of a multi-wavelength camera, the innermost element ring is sensitive to ultraviolet light, the outermost element ring is sensitive to infrared light, and the rings therebetween have sensitivities for intermediate wavelengths of light. In such a multi-wavelength configuration as described above, the focused image can be analyzed for each discrete range of wavelengths using the same camera. In such an application, of course, telescope 110 preferably is of the reflecting type as a refracting telescope will have different focal lengths for the differing wavelengths.

It will be apparent to those skilled in the art that modifications and variations can be made in the apparatus of this invention without departing from the scope of the invention. The invention is its broader aspect is, therefore, not limited to the specific details and illustrated examples shown and described. Accordingly, it is intended that the present invention cover such modifications and variations provided that they fall within the scope of the appended claims and their equivalents.

What is claimed is:

1. A ring array imaging system, comprising:
   an annular array of image detecting elements, said annular array being substantially axisymmetric about a longitudinal axis; and
   means for projecting onto the entire annular array of image detecting elements simultaneously a complete image focused onto an imaginary focal plane positioned proximate said longitudinal axis.

2. The imaging system of claim 1, wherein said annular array of image detecting elements is disposed on a substantially flat disc.

3. The imaging system of claim 2, wherein said disc includes an image-free area radially inward of said image detecting element array and said projecting means projects said image onto said disc only radially outside said image-free area.

4. The imaging system of claim 3, further comprising at least one preamplifier mounted on said disc in said image-free area, said preamplifier being operative with said annular array.

5. The imaging system of claim 3, further comprising at least one multiplexer mounted on said disc in said image-free area, said multiplexer being operative with said annular array.

6. The imaging system of claim 1, wherein said annular array of image detecting elements is disposed on a conical surface axisymmetric with said longitudinal axis.

7. The imaging system of claim 1, wherein said image detecting elements convert incident infrared radiation into electrical signals.

8. The imaging system of claim 1, wherein said projecting means includes a primary reflector cone positioned at said longitudinal axis proximate said imaginary focal plane, said primary reflector cone having a substantially conical primary reflecting surface reflecting said focused image radially outwardly with respect to said longitudinal axis.

9. The imaging system of claim 8, wherein said primary reflector cone is a right circular cone having an axis coincident with said longitudinal axis.

10. The imaging system of claim 8, wherein said primary reflecting surface of said primary relfector cone includes a plurality of circumferentially disposed primary facets.

11. The imaging system of claim 10, wherein each of said primary facets is substantially planar.

12. The imaging system of claim 10, wherein each of said primary facets is concave.

13. The imaging system of claim 11, wherein each of said primary facets is divided into a plurality of longitudinally disposed primary facet segments.

14. The imaging system of claim 8, wherein said annualr array of image detecting elements is positioned radially outwardly of said primary reflector cone with respect to said longitudinal axis and is disposed on a conical surface axisymmetric with said longitudinal axis.

15. The imaging system of claim 8, wherein:
said annular array of image detecting elements is disposed on a substantially flat disc; and
said projecting means further includes a secondary reflector positioned radially outwardly of said primary reflector cone with respect to said longitudinal axis and having a substantially conical secondary reflecting surface relfecting said focused image from said primary reflector cone onto said annular array of image detecting elements.

16. A ring array camera, comprising:
means for focusing an image onto an imaginary focal plane;
an annular array of image detecting elements disposed on a substantially flat disc, said annular array being substantially axisymmetric about a longitudinal axis passing through said imaginary focal plane, said annular array and said focusing means being on longitudinally opposite sides of said imaginary focal plane;
a primary reflector cone positioned at said longitudinal axis proximate said imaginary focal plane, said primary reflector cone having a substantially conical primary reflecting surface reflecting said focused image radially outwardly with respect to said longitudinal axis; and
a secondary reflector positioned radially outwardly of said primary reflector cone with respect to said longitudinal axis and having a substantially conical secondary reflecting surface reflecting said focused image from said primary reflector cone onto said annular array of image detecting elements.

17. The camera of claim 16, wherein said focusing means includes a catoptric zoom telescope.

18. The camera of claim 16, wherein each of said primary and secondary reflecting surfaces is substantially axisymmetric with respect to said longitudinal axis and forms an angle of about 45° with respect to said longitudinal axis.

19. A ring array imaging system, comprising:
annular array of image detecting elements, said annular array being substantially axisymmetric about a longitudinal axis;
means for projecting onto said annular array of image detecting elements an image focused onto an imaginary focal plane positioned proximate said longitudinal axis; and
means for scanning said focused image radially inwardly and outwardly across said annular array of detecting elements.

20. The imaging system of claim 19, wherein said annular array of image detecting elements is disposed on a substantially flat disc.

21. The imaging system of claim 20, wherein said disc includes an image-free area radially inward of said image detecting element array and said projecting means projects said image onto said disc only radially outside said image-free area.

22. The imaging system of claim 21, further comprising at least one preamplifier mounted on said disc in said image-free area, said preamplifier being operative with said annular array.

23. The imaging system of claim 21, further comprising at least one multiplexer mounted on said disc in said image-free area, said multiplexer being operative with said annular array.

24. The imaging system of claim 19, wherein said annular array of image detecting elements are disposed on a conical surface axisymmetric with said longitudinal axis.

25. The imaging system of claim 19, wherein said annaular array of image-detecting elements includes a single linear array of image-detecting elements arranged in a circle.

26. The imaging system of claim 25, wherein said linear array converts incident infrared radiation into electrical signals.

27. The imaging system of claim 19, wherein said annular array of image detecting elements includes a plurality of concentric circuilar arrays of image detecting elements, each of said circular arrays converting radiation of a selected wavelength range into electrical signals.

28. The imaging system of claim 19, wherein said projecting means includes a primary reflector cone positioned at said longitudinal axis proximate said imaginary focal plane, said primary reflector cone having a substantially conical primary reflecting surface reflecting said focused image radially outwardly with respect to said longitudinal axis.

29. The imaging system of claim 28, wherein said scanning means includes a linear actuator connected to said primary reflector cone.

30. A ring array camera, comprising:

means for focusing an image onto an imaginary focal plane;

an annular array of image detecting elements disposed on a substantially flat disc, said annular array being substantially axisymmetric about a longitudinal axis passing through said imaginary focal plane, said annular array and said focusing means being on longitudinally opposite sides of said imaginary focal plane;

a primary reflector cone positioned at said longitudinal axis proximate said imaginary focal plane, said primary reflector cone having a substantially conical primary reflecting surface reflecting said focused image radially outwardly with respect to said longitudinal axis;

a secondary reflector positioned radially outwardly of said primary reflector cone with respect to said longitudinal axis and having a substantially conical secondary reflecting surface reflecting said focused image from said primary reflector cone onto said annular array of image detecting elements; and a linear actuator connected to said primary reflector cone for reciprocating said primary reflector cone along said longitudinal axis to scan said focused image radially inwardly and outwardly across said annular array of image detecting elements.

* * * * *

UNITED STATES PATENT AND TRADEMARK OFFICE
CERTIFICATE OF CORRECTION

PATENT NO. : 4,837,451
DATED : June 6, 1989
INVENTOR(S) : GEORGE T. PINSON

It is certified that error appears in the above-identified patent and that said Letters Patent is hereby corrected as shown below:

IN THE SPECIFICATION:

Column 1, line 4, "BACKGROUNG" should be --BACKGROUND--;
Column 1, line 31, "electical" should be --electrical--;
Column 1, line 33, "provided" should be --provide--;
Column 1, line 46, "tht" should be --that--; and
Column 1, line 60, "camara" should be --camera--.

Column 2, line 28, after "is" insert --a--; and
Column 2, line 56, "stationary" should be --secondary--.

Column 3, line 11, "camara" should be --camera--;
Column 3, line 14, "camaras" should be --cameras--;
Column 3, line 17, "camara" should be --camera--;
Column 3, line 19, "camara" should be --camera--; and
Column 3, line 26, "preferable" should be --preferably--.

Column 4, line 42, "preferable" should be --preferably--;
Column 4, line 51, "preferable" should be --preferably--;
Column 4, line 56, "teh" should be --the--;
Column 4, lines 66-67, "refleting" should be --reflecting--;
Column 4, line 67, "." (second occurrence) should be --,--.

UNITED STATES PATENT AND TRADEMARK OFFICE
CERTIFICATE OF CORRECTION

PATENT NO. : 4,837,451
DATED : June 6, 1989
INVENTOR(S) : GEORGE T. PINSON

It is certified that error appears in the above-identified patent and that said Letters Patent is hereby corrected as shown below:

Column 5, line 7, after "optical" insert --imaging--;
Column 5, line 9, "(b)" should be --(c)--.

IN THE CLAIMS:

Column 7, line 27, "refector" should be --reflector--;
Column 7, lines 37-38, "annualr" should be --annular--;
Column 8, line 46, "annaular" should be --annular--; and
Column 8, line 54, "circuilar" should be --circular--.

Signed and Sealed this

Twenty-seventh Day of February, 1990

*Attest:*

JEFFREY M. SAMUELS

*Attesting Officer*   *Acting Commissioner of Patents and Trademarks*